J. O. GETZ.
PNEUMATIC TIRE PROTECTOR.
APPLICATION FILED JAN. 24, 1908.
909,884.
Patented Jan. 19, 1909.
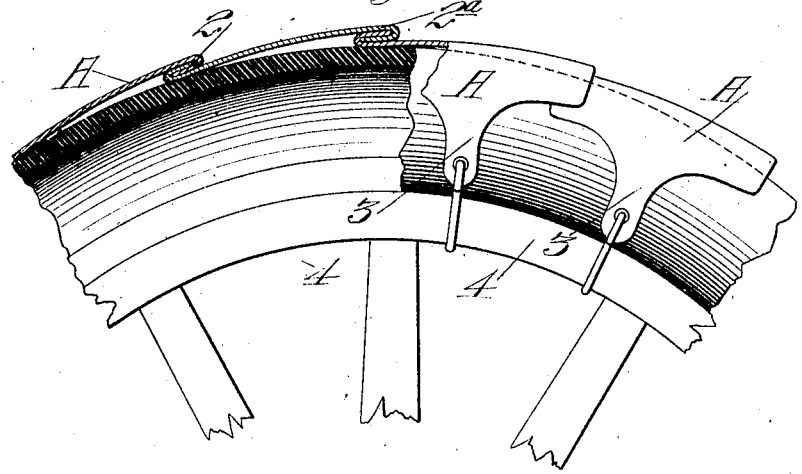
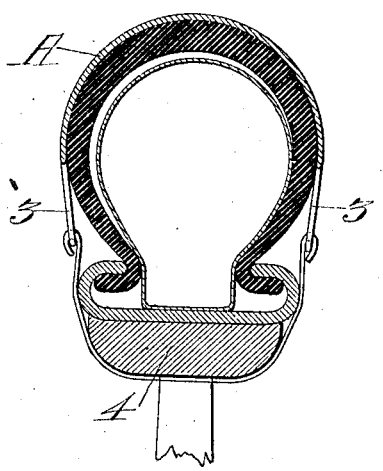

UNITED STATES PATENT OFFICE.

JOHN O. GETZ, OF ALAMEDA, CALIFORNIA.

PNEUMATIC-TIRE PROTECTOR.

No. 909,884.

Specification of Letters Patent.

Patented Jan. 19, 1909.

Application filed January 24, 1908. Serial No. 412,511.

*To all whom it may concern:*

Be it known that I, JOHN O. GETZ, citizen of the United States, residing at Alameda, in the county of Alameda and State of California, have invented new and useful Improvements in Pneumatic-Tire Protectors, of which the following is a specification.

My invention relates to an improved armor or shield for vehicle tires.

It consists of a series of curved interlocking plates fitting the exterior surface of the tire, and means for independently securing said plates to the wheel rim.

It also comprises details of construction which will be more fully explained by reference to the accompanying drawings, in which—

Figure 1 is a part elevation and part sectional view of a portion of a wheel embodying my invention, Fig. 2 is a cross sectional view of the same.

Various metal and other protecting devices for the treads of pneumatic rubber-tired wheels have been constructed, with means independent of the protectors by which they may be secured in place.

In my invention I have designed a series of independent flexibly and movably connected protecting shields, with unions which maintain them in place relative to each other, and additional devices by which they may be further secured to the wheel piece.

A—A are sheets of metal or other bendable material, which will be substantially impermeable to such obstructions as are liable to be met with upon the road. These sheets are bent first to a curvature to substantially that of the inflated tire to which they are to be fitted. At each end these plates are bent or folded back upon themselves as at 2—2ª. The rearward bend 2 incloses the outer surface of the part A and the bend 2ª follows the outline of the inner surface of the plate. These bent portions are a sufficient distance from the contiguous surfaces of the plate A to allow them to be interlocked with each other; the outwardly turned part 2 fitting into the channel formed by the corresponding inwardly turned part 2ª, and the two parts are thus interlocked and connected together. The whole series being interlocked all the way around the tire, it will be seen that I have a perfect protection for the tread of the tire, with sufficient mobility of the parts with relation to each other to accommodate themselves to the alternate compression and extensions of the tire surfaces without disengaging them. The transverse curvature of the plates A is sufficient to cover that portion of the tread which comes in contact with the ground. In order to prevent these plates from turning out of their proper position, I have shown them formed with extensions 3, which extensions are narrowed as shown, and may have holes or slits made in their inner ends. These inner ends approach the rim of the felly of the wheel, and each plate of the armor may be secured by means of a cord, wire, strap or other securing device which passes around the inner surface of the felly of the wheel 4.

In order to apply this sheet of armor, the air may be allowed to escape from the tire which will thus collapsé or become sufficiently smaller to allow as many of these plates to be interlocked and extend around the tire as are necessary to completely cover it. The length of each plate is so designed that a certain number of the plates will encircle the tire, and by reason of its less diameter, the plates may be interlocked or hooked together. The tire then being again inflated, will again expand and will draw the interlocking edges of the armor plates closely together, and will at the same time fit itself closely with the shell or armor thus formed. The transverse securing cords or devices may then be introduced through the holes in the tongues or extensions and secured around the interior of the wheel felly; the shape and connection of the plates, and this transverse fastening serving to maintain the plates in their proper position with relation to the tire. It will be seen that at each interlock of plates there will be a slight projection on account of the inturning of the flanges 2ª, and these projecting shoulders serve to increase the traction of the wheel upon the ground, and to prevent slipping on wet or yielding surfaces.

The device can be readily disengaged and taken off in sections by simply deflating the tire and will, in addition to protecting the tire against puncture, largely prevent the wear caused by traction and slippage upon the road surface.

Having thus described my invention, what I claim and desire to secure by Letters Patent is—

1. A tire armor consisting of a series of independent shields curved transversely to substantially fit the transverse curvature of the tire, each shield having an outwardly turned flange at one end, and an inwardly turned flange at the other, said flanges adapted to interlock and form a continuous armor along the periphery of the tire.

2. In a tire armor of the character described, independent plates curved to fit the transverse curvature of the tire, each plate having an outwardly turned lip at one end, and an inwardly turned lip at the opposite end, said lips adapted to interlock, central extensions or tongues upon each side of the plates projecting inwardly, and means by which each pair of tongues are connected across the interior of the wheel felly.

3. In a tire armor of the character described, a series of independent plates transversely curved to fit the exterior of the tire, each plate having central tongues extending inwardly upon opposite sides of the felly, and connecting wires or links extending across the interior of the felly, said plates having the ends bent in reverse directions to form respectively exterior and interior lips adapted to interlock with those of the contiguous plates to form a continuous shoe and to form anti-slipping ridges upon the exterior.

In testimony whereof I have hereunto set my hand in presence of two subscribing witnesses.

JOHN O. GETZ.

Witnesses:
  WALTER L. BRADBURY,
  CLARENCE FULTON.